(No Model.)
C. A. HUGHES.
REIN HOLDER.
No. 477,547. Patented June 21, 1892.
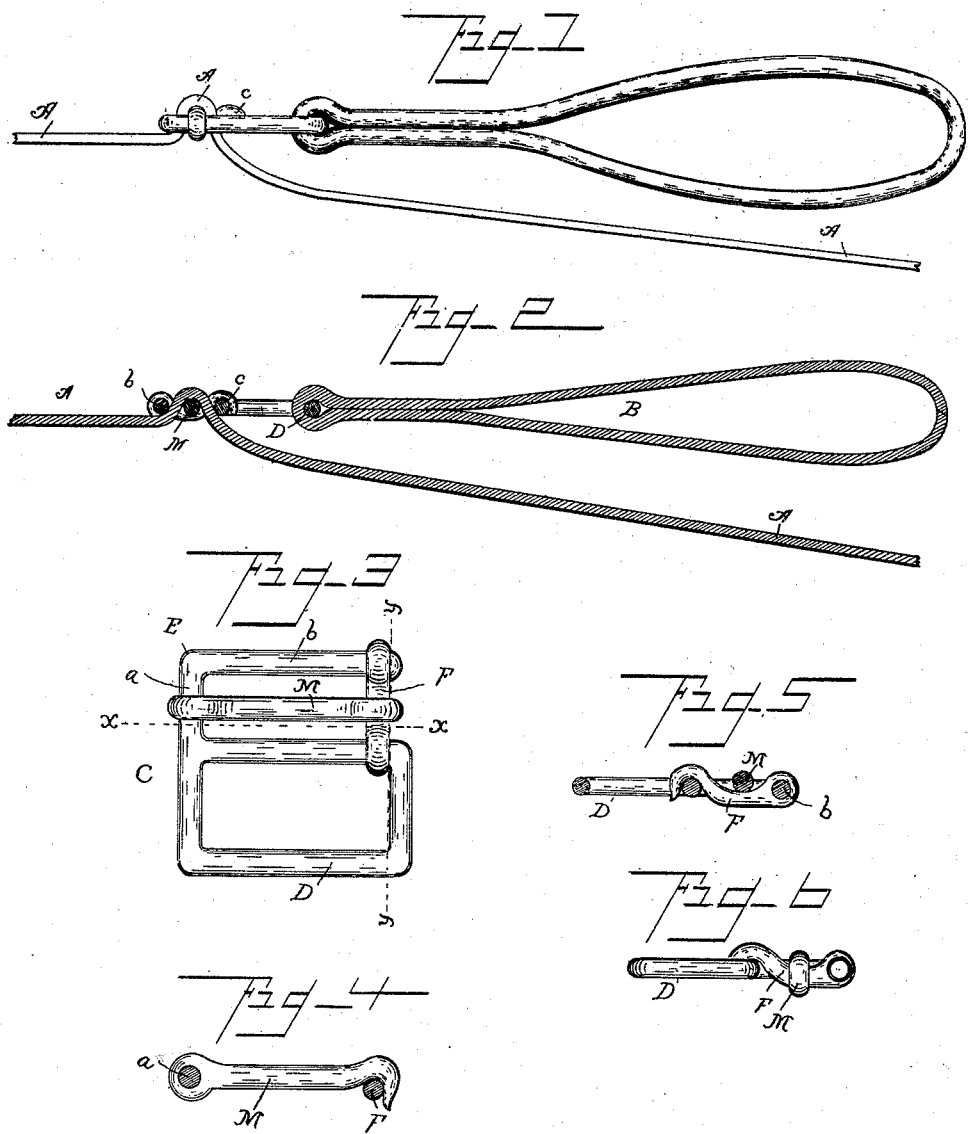

UNITED STATES PATENT OFFICE.

CURTIS A. HUGHES, OF SPOKANE, WASHINGTON.

REIN-HOLDER.

SPECIFICATION forming part of Letters Patent No. 477,547, dated June 21, 1892.

Application filed January 6, 1892. Serial No. 417,147. (No model.)

*To all whom it may concern:*

Be it known that I, CURTIS A. HUGHES, a citizen of the United States, residing at Spokane, in the county of Spokane and State of Washington, have invented a new and useful mechanical appliance known as "The Hughes Side-Adjustable Line-Holder;" and I hereby declare that the following is a full, clear, and exact description of the invention.
My invention has relation to improvements in driving-line holders, its general object being to provide a line-holder adapted to be readily and securely connected to a line at any point in the length thereof.
A further object of my invention is to provide a line-holder adapted to be readily connected to and removed from a line without the objectionable necessity of cutting or puncturing the same.
To the attainment of the foregoing and other objects, the invention consists in the peculiar construction, certain novel combinations, and the adaptation of parts hereinafter described, and particularly pointed out in the claims appended.

In the accompanying drawings, Figure 1 is a side elevation of my improved line-holder connected to a line. Fig. 2 is a longitudinal section of the same. Fig. 3 is a top plan view of the coupling. Fig. 4 is a section of the same, taken in the plane indicated by the line X X of Fig. 3. Fig. 5 is a section taken in the plane indicated by the line Y Y on Fig. 3, and Fig. 6 is an elevation of one end of the coupling.

In the said drawings similar letters designate corresponding parts throughout the several views, referring to which—

A indicates a driving-line, and B indicates a hand-hold, both of which may be of the ordinary or any approved form and construction.

C indicates my improved coupling for effecting a connection of the hand-hold to the line.

The body-loop D of the coupling C, which is connected to the hand-hold B in any approved manner, is provided with an angular arm E, which comprises the forwardly-extending branch $a$ and the lateral branch $b$, which latter preferably extends the full length of the body-loop and is designed to serve in conjunction therewith to form an opening to receive the line A, which is looped and inserted therein, as better shown in Fig. 2 of the drawings. Pivotally connected to the lateral branch $b$ of the arm E is a link F, which is provided at its free end with a hook $c$, designed to engage the forward transverse bar of the body-loop D. This link F is also provided at an intermediate point in its length with a depression designed to seat the keeper-bar M, which is pivotally connected at one end to the branch $a$ of the arm E, and is provided at its opposite end with a hook designed and adapted to engage the link F, as better shown in Fig. 3 of the drawings.

To connect a hand-grasp provided with an improved coupling to a line, the link F and the keeper-bar M are thrown back and the line is bent upon itself to form a loop, which is inserted in the opening formed between the lateral branch of the arm E and the forward bar of the body-loop. The link F is then swung into engagement with the forward bar of the body-loop and the keeper-bar is passed through the loop of the line and placed in engagement with the link. Thus it will be perceived that the hand-grasp may be readily connected to a line at any point without the objectionable necessity of putting it on the end of the line and moving it to the desired point. It will be further perceived that the pressure of the line upon the keeper-bar will prevent said bar from raising, by reason of which the liability of a casual disconnection of the hand-hold from the line is obviated.

In practice I prefer to employ some suitable device for detachably connecting the under side of the hand-hold to a line; but I do not desire to be confined to the same, as its use is only preferable.

I claim—

1. As an improved article of manufacture, the driving-line holder, substantially as described, comprising the hand-hold and the coupling for effecting a connection of the hand-hold to a line, which coupling is connected to a hand-hold and comprises a body-loop, the angular arm B, a link pivotally connected to the laterally-disposed branch $b$ of said arm and adapted to engage the body-loop, and a keeper-bar pivotally connected to the forwardly-extending branch $a$ of the angular arm and adapted to engage the link, substantially as and for the purpose set forth.

2. As an improved article of manufacture, a coupling for effecting a connection of a hand-hold to a driving-line, comprising a body-loop, the angular arm E, a hook-shaped link pivotally connected to the laterally-disposed branch of the said arm and adapted to engage the body-loop, and a keeper-bar pivotally connected to the forwardly-extending branch of the angular arm and adapted to engage the link, substantially as specified.

CURTIS A. HUGHES.

Witnesses:
JOHN K. DOW,
MARIETTA E. HUGHES.